Sept. 28, 1965

R. C. WEBB 3,209,348

ADD-SUBTRACT SEPARATOR

Filed Jan. 8, 1963

INVENTOR:
RICHARD C. WEBB

BY:
Merriam, Smith & Marshall
Attorneys

FIG. 3

Sept. 28, 1965 R. C. WEBB 3,209,348
ADD-SUBTRACT SEPARATOR
Filed Jan. 8, 1963 4 Sheets-Sheet 3

FIG. 4

INVENTOR:
RICHARD C. WEBB
BY
Merriam, Smith & Marshall.
Attorneys

United States Patent Office 3,209,348
Patented Sept. 28, 1965

3,209,348
ADD-SUBTRACT SEPARATOR
Richard C. Webb, Broomfield, Colo., assignor, by mesne assignments, to International Telephone and Telegraph Corporation, New York, N.Y., a corporation of Maryland
Filed Jan. 8, 1963, Ser. No. 250,186
4 Claims. (Cl. 340—347)

This application is a division of application Serial No. 797,264, filed March 4, 1959, now U.S. Patent No. 3,152,-324, dated October 6, 1964.

This invention relates to apparatus and circuitry for providing continuous measurement and digital encoding of the relative phase difference between two substantially sinusoidal electrical signals of equal frequency but variable phase angle.

In its preferred form the invention finds a principal application in the digital encoding of the relative phase difference between two electrical signal waves generated under the control of a precision electrostatic shaft-position-transducer which may be, illustratively, of the form described by this applicant in United States patent application Serial No. 578,853, filed April 17, 1956, now U.S. Patent No. 2,930,033, dated March 22, 1960. The transducer in its preferred form is a generator of two sinusoidal electrical signals of known and selected frequency, normally identical and one of which is of reference phase while the other adjusts to an advanced or retarded phase position in proportion to angular movements imparted to the mechanical shaft. Some phase measuring devices of the above type are designed to produce an electrical phase shift of precisely 360 electrical degrees for each mechanical degree of mechanical movement. By this invention a continuous electronic phase angle encoder is used in conjunction with an angle transducer to provide an apparatus by which angular positions of a shaft are interpreted in terms of digital signals with an accuracy considerably greater than that achieved by methods heretofore known or suggested.

The techniques embodied in this invention avoid the need for sampling of the analog information to be encoded into digital form, as is common in many analog-to-digital encoding schemes, so that the digital information is continuously available from the electronic apparatus and there is no delay entailed in the acquisition of information, as has been inherent in encoders of earlier designs.

According to the principles of this invention a large number of applications for shaft encoding apparatus of high precision manifest themselves. Such applications, by way of example, may be in the continuous measurement of azimuth and elevation shafts in optical tracking instruments and radars employed in guided missile range instrumentation; the measurement of angular displacements of stable platforms; the registration of angular settings of rotary tables used in machine tool applications, as well as many other applications that will suggest themselves to those skilled in the art to which the invention is directed.

The broad principle involved in the electrical phase angle measuring disclosed by the invention herein to be set forth is that of first relating each of the two signals whose relative phase is to be measured to selected harmonics of sufficiently high order to permit the harmonic frequencies to be used as a time measuring scale of fractional portions of the basic or fundamental signals.

In accordance with the invention, and that preferred form of it herein to be particularly discussed, the one-thousandth harmonic of a given wave is used as a scale, which permits making measurements to a least count or granularity of 1/1000 of a wavelength or 0.360 electrical degree. As the invention will herein be described, each of the two basic signals is related to a selected harmonic of the same order (the one-thousandth harmonic, for example) and these harmonic signals are applied to a summing circuit wherein they are permitted to interfere constructively and destructively (additively and subtractively) with one another in accordance with movements or shifts in the relative phase position of the basic signals. In a case where the related signals are chosen as the one-thousandth harmonics, one thousand interference maxima and minima will occur as the basic electric waveforms are shifted in phase by one wavelength. If this amount of electrical shift is produced by a shaft position transducer due to rotation through one mechanical degree, then a summation of interference maxima is a measure to one-thousandth part of a mechanical degree or increments of 3.6 sec. of arc.

In the event the mechanical shaft is rotated first in one direction and then in the other, that is, for instance, clockwise and counter-clockwise, it becomes necessary to register the number of "up" counts (as for an increasing phase change) as well as the number "down" counts (as, for instance, for a decreasing phase change) to maintain the latest information concerning the shaft setting. One part of this invention relates to an "up-down" separator which functions in conjunction with the interference detector to transmit a series of "up" counts over a signal channel to a digital counter, as well as a series of "down" counts over another signal channel to the same counter, the counter being one of a type adapted to be advanced by "up" counts and retarded by "down" counts, thereby retaining at all times a "net" count at any given instant.

Mechanical transducers of the foregoing type, even when made to the ultimate limit of mechanical perfection, inherently introduce amplitude and phase perturbations in the two basic signals derived therefrom. These mechanical imperfections result in a so-called "jitter" in the produced results unless compensated but by this invention they are minimized and substantially compensated for by purely electrical means according to the circuitry herein to be described. The mechanical transducers simultaneously produce both the amplitude and phase components of the mechanical perturbation. Fortunately, only the phase errors register in the electronic encoding apparatus which is substantially insensitive to amplitude disturbances. Accordingly, it becomes possible to amplitude demodulate the perturbation wave to produce a signal voltage that is substantially a replica of the disturbance. This invention provides for recovering such a voltage which is then introduced into an appropriate electrical phase-locking circuit to be used to tie the high frequency harmonic to its base signal in such a manner as to introduce a counter-perturbation into the phase-locking circuit in such a way as to oppose the natural perturbation coming directly from the phase modulation of the base signal. The combined effect is a neutralization of the disturbance.

This application is directed particularly to the electrical circuitry by which the add-subtract functions are achieved. It constitutes a divisional application of application Serial No. 797,264, filed March 4, 1959, by this inventor. The invention and circuitry here disclosed provide a controlled display of high accuracy which gives decimal indications of mechanical conditions obtained in an angle measuring assembly. The invention is illustrated in its preferred form by the accompanying drawings which schematically show complete operating circuitry to achieve the encoding functions and which show specifically the associated components with which this divisional application is particularly concerned.

With the foregoing in mind it becomes apparent that one of the many objects of the invention is that of providing for substantially continuously exhibiting and recording as measured value of great detail indications of certain electrical phenomena not otherwise readily comparable.

Other and further objects and advantages of the invention are set out by the parent application above identified. Still other objects will become apparent and at once suggest themselves to those skilled in the art to which the invention is directed in the following description as considered particularly in connection with the accompanying drawings wherein:

For the purpose of illustrating the present invention in one of its aspects it will be assumed, for instance, that an electro-mechanical transducer provides the wave generating mechanism and that regardless of the built-in mechanical precision certain changes produce slowly fluctuating amplitude of the generated voltage waves. This transducer has a driven shaft element 11 which is turned continuously and uniformly at as constant a speed as possible by means of a suitable driving motor (not shown but connected in any desired way to drive the shaft 11). The motor is supplied with input motive power from any desired source (not shown) connected to it in well-known fashion. A plurality of rotor elements are carried upon the shaft 11. These elements are provided at their outer peripheral edge with teeth elements 17 which are separated from each other by slots or recesses 19. The teeth are formed usually by engraving the slots or recesses on the periphery of the surface of the rotor so that the unengraved portions represent the teeth. Iullustratively, the rotor periphery may have uniformly spaced thereabout 360 teeth separated by a like number of slots. Each tooth is thus spaced from each adjustment tooth by one degree intervals on centers. For simplicity of reference and explanation of workings of one form of this apparatus, reference may be made to what may be regarded as a 360 degree device.

The stator elements 20 and 20' (see FIGS. 1 and 2) each have a similar number of teeth 21. Likewise, a similar number of recesses or slots 23 separates these teeth. The inner diameter of the circular component formed by the stator 20 or 20' is made just slightly larger than the outer diameter of the rotor element and the teeth 17 so that with the rotor positioned to turn within the stator a very small air gap exists between the teeth 17 and 21 when these are brought as close to each other as possible.

The rotor element 15 is connected to ground or to a source of fixed potential 25 by way of the indicated conductor 27 and the brush or slip-ring on the shaft 11. Electrical connection is made to the stator 20 through the conductor 28 which connects to ground 25 through the charging resistor 29 and the source 31. The stator element is thus maintained insulated from ground 25 and, with rotation of the rotor element 15, the varying capacitance between it and the stator element 20 is supplied with charging current from the source 31 through the resistor 29. The rotation of the rotor element causes the teeth of the stator successively to be aligned with the rotor teeth and to be separated from the rotor teeth producing charging of the condenser to a potential determined by the capacity between the rotor and the stator teeth elements. Variation in capacitance due to rotation of the rotor then induces a corresponding change of the charging current from the source and produces across the resistor 29 a voltage which becomes available on the conductor 53. This wave may have the form of that wave indicated immediately beneath the conductor. A like frequency wave is generated by the rotor-stator combination 19, 20' with the output wave available on conductor 55. Primed numbers in FIG. 2 represent components like those described in producing the waveform available on conductor 53 of FIG. 1.

Figures 1, 2:
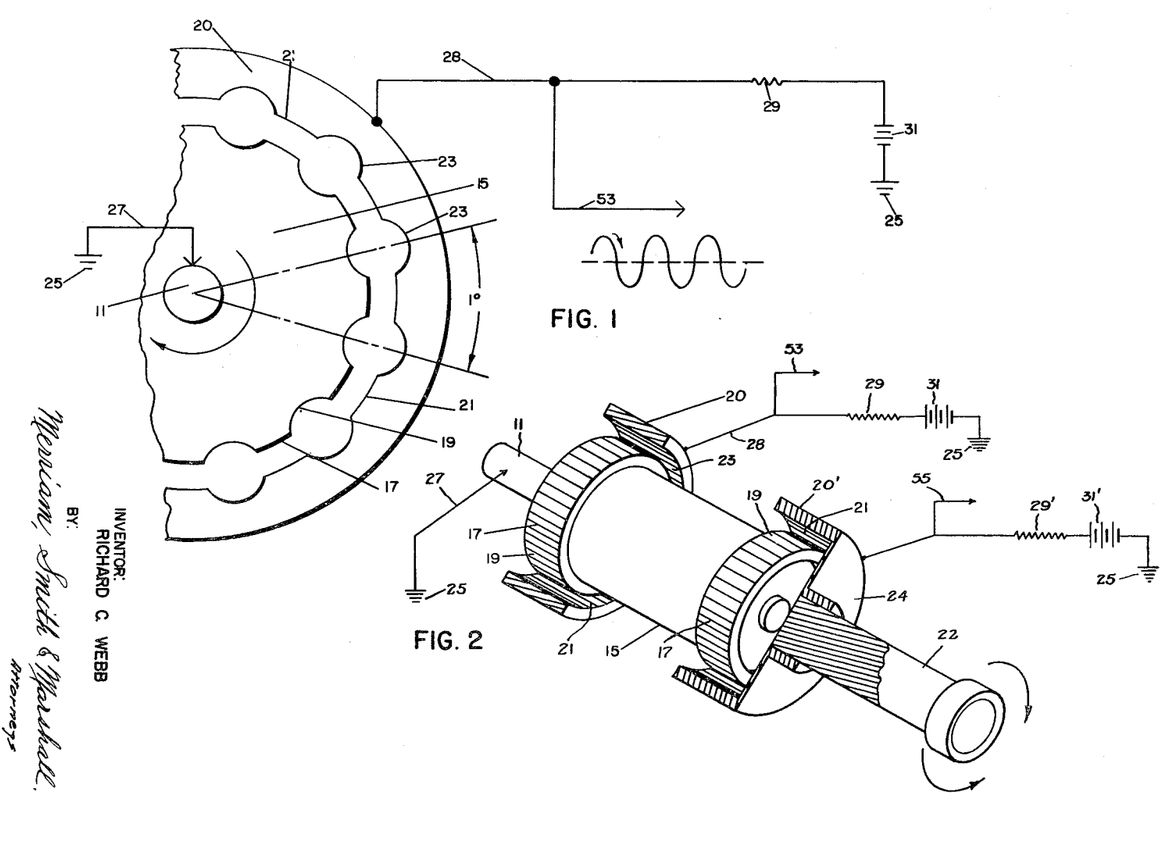
FIG. 1 is a schematic diagrammatic view depicting in elementary form a form of electrostatic tone generating apparatus providing one form of arrangement in electro-mechanical transducer to develop each of a standard or reference frequency and a variable phase frequency for comparison with the standard.
FIG. 2 is an isometric view of the electro-mechanical transducer to indicate one mechanism to introduce phase shifts between two developed electrical waves.

When the rotor element is provided with two sets of teeth, as in FIG. 2, both are carried upon the shaft 11 and each is positioned adjacent to the other, and each is adapted to rotate relative to its own related stator element so that it becomes apparent that two separate 5.4 kc. per second waves are developed and available on conductors 53 and 55.

In applying the invention to apparatus for encoding interference effects which constitute a measure of angular departures of one element relative to another, the driven elements, such as the rotor 15, are caused to turn relative to a pair of stator elements 20 and 20'. One of the stator elements, such as element 20, remains in fixed position at all times and the other 20' is adjustable. The adjustable stator element 20' is subject to being changed in its angular position relative to the rotor with changes in its resulting from induced mechanical turnings of a controllable component, such as the conventionally represented control shaft 22 (FIG. 2). In each instance the rotor elements revolving internally of the stator elements 20 and 20' produce output electrical waves of substantially sinusoidal form whose frequency is substantially identical, although the phase of the generated waves produced by the rotor-stator combination which is adjustable is subject to change relative to the reference frequency from the other wave-generating component. In this sense the phase may be advanced or retarded relative to the reference phase.

In practicing the invention, the element whose angular state is to be determined is rotated (as indicated by the arrow in FIG. 2) to turn the shaft 22 and with it the hub 24 and the stator 20'. This introduces a phase change in the waveform available on conductor 55 as compared to that available on conductor 53. This change is then precisely determined.

Figure 3:
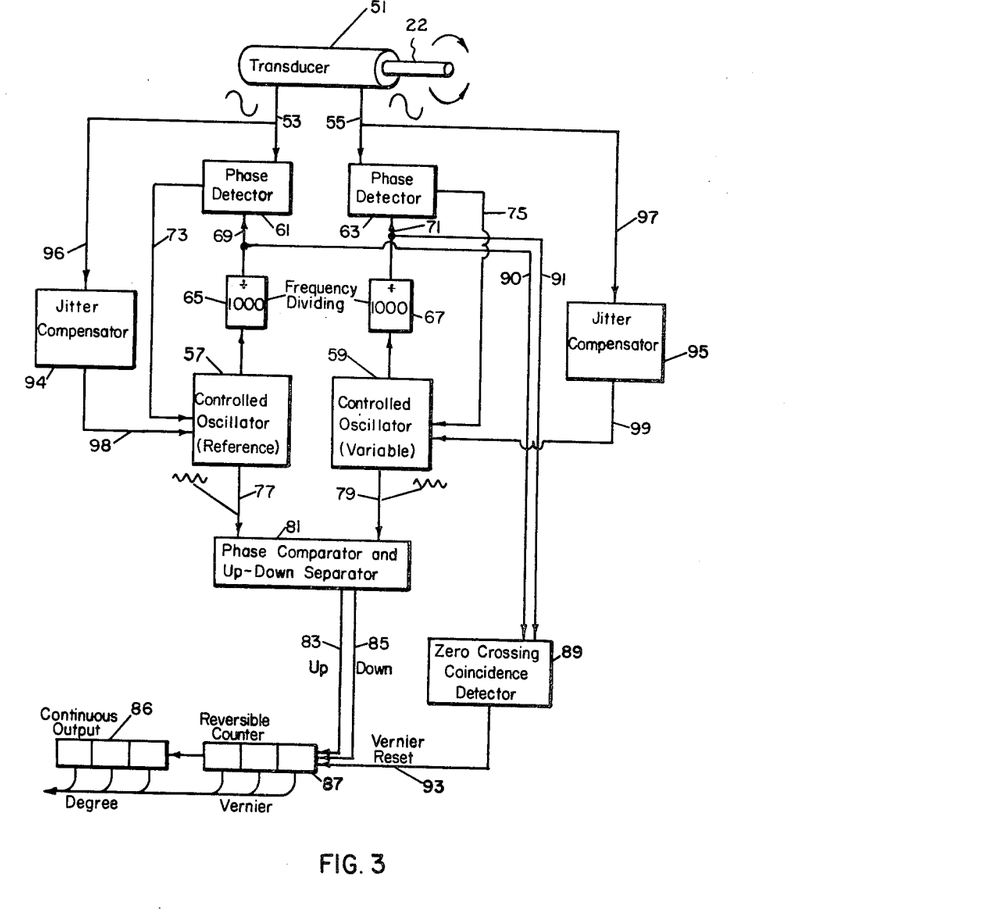
FIG. 3 is a diagrammatic view presented to show in block diagram form the component parts comprising a preferred form of the apparatus herein to be described.

By FIG. 3 of the drawings the transducer element to produce the reference and variable phase electrical waves is shown conventionally at 51. It will be noted that for the purpose of indicating the fact that the variable phase generated wave may either be retarded or adavnced with respect to the reference that the rotary transducer is shown as capable of revolving in either a clockwise or counterclockwise direction, as designated by the arrows adjacent to the shaft 22 in each of FIGS. 2 and 3. Output voltages of a waveform substantially like those forms shown adjacent to the transducer are provided on the conductors 53 and 55, the waveforms on the conductor 53 for reference purposes being considered as developed from the combination of the permanently fixed stator 20 and its rotor 15 with teeth 17 and those waveforms developed on the conductor 55 being considered to have been developed by the relative change between rotor 15 and its teeth 17 relative to the stator element 20', the relationships, of which are adjustable with respect to each other, as already explained. The frequency of the output voltages on conductors 53 and 55 may be chosen at any value desired, although it will be understood that the chosen generated frequency is determined by the number of separate pole pieces on the rotor and stator elements and the speed of rotation of the elements. For instance, if each rotor and stator is provided with 360 teeth and the rotor is turned on the shaft 11 relative to the stator at a speed of 900 r.p.m., the output frequency on conductors 53 and 55 will be a waveform repeating at a frequency of 5.4 kc. Concurrently with the generation of the reference and variable phase voltages at the assumed frequency, which is here given solely by way of example to provide an illustration of one form of the operation of the apparatus and circuitry herein to be set forth, there is generated in the conventionally indicated generators 57 and 59 for the reference and variable frequency panels, respectively, oscillations which occur at a harmonic of the frequency developed from the transducer.

The oscillators 57 and 59 are not shown by circuit components since these are of any form well known in the art. One form of the oscillator which has proved quite satisfactory is the well-known Colpitts-type which provides extremely stable operation. The generated frequency is, however, subject to control, as desired, in well-known fashion. The reference and variable phase output voltages are developed and available along the conductors 53 and 55 from which they are supplied to suitable phase detectors 61 and 63, the character of which is well known and need not be described herein in detail. Suffice it to say that the phase comparison of voltages is made between a sub-harmonic of the reference and variable master oscillator frequency as supplied to the phase detectors from frequency dividers 65 and 67 through conductors 69 and 71.

The frequency dividers 65 and 67 are of any well-known type suitable for providing a frequency division. In the illustrated case a frequency division of one thousand has proved satisfactory so that in the phase detectors 61 and 63 a phase comparison is made between the master control oscillator at its one-thousandths sub-harmonic and the developed generated frequency. The technique followed in this phase detector is essentially similar to that adopted in the well-known form of television circuitry wherein the so-called fly wheel type of synchronization is established. Any phase differences between the frequency of the waveform applied via the conductors 69 and 53 to the phase detector 61 or via the conductors 71 and 55 to the phase detector 63 will then manifest themselves as a suitable control voltage available respectively on the conductors 73 and 75 which then may be supplied as a D.-C. control voltage, for instance, which is fed back to control and adjust the frequency of the oscillators 57 and 59, respectively. This control may be provided in well-known manner, such as by applying the phase-detected voltage as a gain control signal for the usual form of reactance tube whose output controls the magnitude of either an inductive or capacitive component in the oscillatory circuit of the oscillators 57 or 59, depending upon which form of signal channel is to be selected. In this way an automatic frequency control loop is established between the oscillators 57 and 59 and the voltages developed on the conductors 53 and 55 through the action of the phase detectors 61 and 63, as the case may be.

Output voltages from the oscillators 57 and 59 comprising the master and variable control voltages occurring at a harmonic frequency of that developed by the transducer are also supplied by way of conductors 77 and 79 to a phase comparator and so-called up-down separator 81, which has been shown in block form on the schematic diagram of FIG. 3 but which circuitry is further outlined and described in the patent application hereinabove identified and set out in substantial detail in the showing of FIG. 5. Suffice it for the moment, however, to state that in the phase comparator and up-down separator 81 output signal voltages of general pulse characteristics are provided and appear on the output conductors 83 and 85 as pulses to be added or subtracted in a reversible counter mechanism. The counters are shown conventionally by the counter components 86 and 87 which each comprise a plurality of separate indicator tubes and of which respectively and for illustrative purposes may be considered as representing degrees of phase shift by the counter 86 and tens, hundreds and thousands of degrees by the counter, schematically represented at 87 and thus forming a so-called vernier counter. The counter itself is in the form of a tube which has become known in the art as a Burroughs-tube and illustratively may be of that form known as the BD 301. Each output pulse available on the conductors 83 or 85 and indicative of either an add or subtract pulse is, accordingly, effective to move the counted indication on the counter vernier up or down one step and thus register increasing or decreasing angle, and, of course, a phase change which is either increasing or decreasing. To illustrate, and still assuming the specific values here depicted, it will be appreciated that if the reference phase oscillator 57 operates at a normal 5.4 mc. and the variable phase oscillator 59 responds to changes in the variable phase input signal to maintain one thousand cycles for every transducer cycle, if the transducer input 55 is turned one mechanical degree thus changing the relative position of one stator tooth relative to a rotor tooth, the variable phase oscillator 59 will generate one thousand cycles more than the reference phase oscillator 57. Likewise, if the angular relationship is changed one mechanical degree clockwise the variable phase oscillator 59 will generate one thousand cycles less than the reference oscillator 57. By the same token, if the input to the transducer is rotated at constant velocity of one degree per second in a clockwise direction, for instance, the output of the variable phase from the transducer will be 5.401 kc. and the variable phase oscillator 59 will then be forced by the controlled voltage to operate at 5.401 mc. which is 1000 cycles per second faster than the reference phase oscillator. Since the signals from both the reference phase oscillator 57 and the variable phase oscillator 59 are applied by way of conductors 77 and 79 to the phase comparator and up-down separator, it will be appreciated that as the variable phase oscillator output moves one cycle with respect to the reference phase oscillator, the phase comparator goes through one null and one reinforcement. In case the variable phase oscillator tends to operate faster than the reference oscillator, there is produced in the output of the phase comparator and up-down separator 81 on the conductor 83 an "up" count for each passing cycle. It follows that if the variable phase oscillator tends to operate slower than the reference oscillator, a "down" count or a pulse is produced on the conductor 85 for each passing cycle. If there is a frequency change which is common to both phases no so-called "up" and "down" counts are produced. Consequently, the effects of small power line frequency changes or hunting conditions to the drive motor are cancelled.

It is desirable to reset the vernier counter 87 to a zero state whenever absolute coincidence is achieved between the variable and reference phase signals at the assumed 1000:1 frequency dividers 65 and 67. The resetting is achieved under the control of the zero crossing coincidence detector conventionally shown at 89 in FIG. 3. In practice, the signals serving to control the zero crossing coincident detector 89 are fed by way of the input conductors 90 and 91, these representing, illustratively, an input determined by the reference and variable phase oscillators 57 and 59 reduced in frequency by an order of 1000. The input signal supplied by way of the conductors is generally in pulse form and serves to provide a zero position indication once each cycle. The output signals from the zero crossing coincidence detectors 89 which control the vernier counter 87 then appear on the conductor 93.

The continuous output counter section 86 is controlled by means of a code plate assembly (not shown), operated in conjunction with the transducer. The code plate assembly is known in the art and provides a control which is indicative of a continuous output of the correct degree information. Control is effected through a brush selecting gate (not shown) which is controlled from the hundreds decade of the up-down counter which determines the selection of a leading or lagging brush in the code plate system. For instance, as is known in the art, for a digit of 0 through 4 in the hundreds counter a leading brush is energized and for a digit 5 through 9 a lagging brush is energized. The code plates then produce a binary coded decimal form of continuous output of the correct degree information and there is no ambiguity in the degree crossovers because the vernier counter 87 is continuously selecting the correct brush to go with the prevailing vernier indicator or reading. This form of control of the output is known and, therefore, is not specifically diagrammed by FIG. 3.

Because of minor mechanical imperfections which are inherently present in mechanically driven devices, despite their manufacture to the limit of mechanical perfection, disturbances which will herein be termed "jitter" frequently arise. While various causes may bring these effects about, one cause often is that due to the rotor shaft running very slightly eccentric so that the amplitude of the generated output voltage waves at the reference and variable frequencies, as appears on the conductors 53 and 55, may vary very slightly. The variation can be in either or both amplitude and phase and even where this is an extremely low frequency change occurring over a long period of time, it is sufficient to cause certain imperfections in the operation unless compensation is provided. It is impossible in general to provide mechanical compensation where the precision of manufacture of the transducer component is the greatest obtainable. Accordingly, this invention makes provision for introducing with the signal generating circuitry an electrical compensator to avoid the detrimental effects of mechanical power "jitter." Such circuitry is set forth in detail in the identified parent application and also by a concurrently executed divisional application filed as Serial No. 250,185 and will not be further considered herein.

Figure 4:
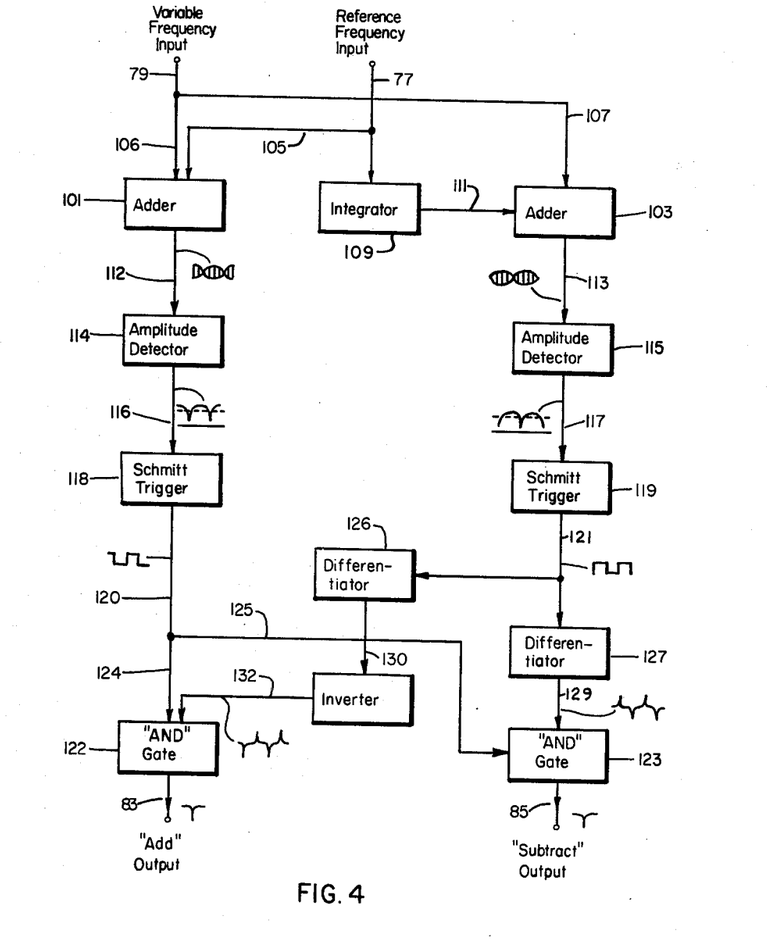
FIG. 4 is a block diagram of the "up-down" separator shown as one part of the diagrammitc view of FIG. 3.

Reference may now be had to the block diagram form of the phase comparator and up-down separator 81 which is in diagrammatic form in FIG. 4. The voltages available upon the conductors 77 and 79, respectively representing the assumed 5.4 mc. reference frequency and variable frequency input, are shown as each being supplied to adder circuits 101 and 103 by way of conductors 105 and 106 to the adder circuit 101 and by way of conductor 107, integrator 109 and conductor 111 to the adder 103. The integrator 109, through which the reference frequency signal is applied, serves to provide a 90° phase lag of the frequency input to the adder 103 with respect to the phase at which this reference frequency is supplied to the adder 101. The adder components, as well as all other components diagrammatically shown by FIG. 4, will be referenced by one preferred form of circuit as shown by FIG. 5. Suffice it for the moment to point out that the adder circuits 101 and 103, respectively, are the well-known resistance combination circuit elements which serve to combine and add the two inputs provided.

The waveforms shown adjacent to the output conductors 112 and 113 from the adders 101 and 103, respectively, represent the beat frequency occurring between variable and reference phase inputs where it is assumed that the variable frequency is increasing very slightly with respect to the reference frequency input and illustrate a condition where a 1 kc. beat is provided for a change in the angular position of the rotary shaft element of 1° per second. In the illustrated curves immediately adjacent to the conductors 112 and 113, it can be seen that the beat frequency waves are shown 90° out-of-phase with each other. While the beat frequency has been represented, illustratively, by the waves adjacent to the conductors 112 and 113 occurring at a frequency of 1 kc., it can be appreciated that if the relative change occurs at a rate of less than 1° per second, the period of the beat frequency wave will be considerably longer and, of course, the smaller the angular change the closer the curves will approach a D.-C. or steady state condition.

Figure 5:
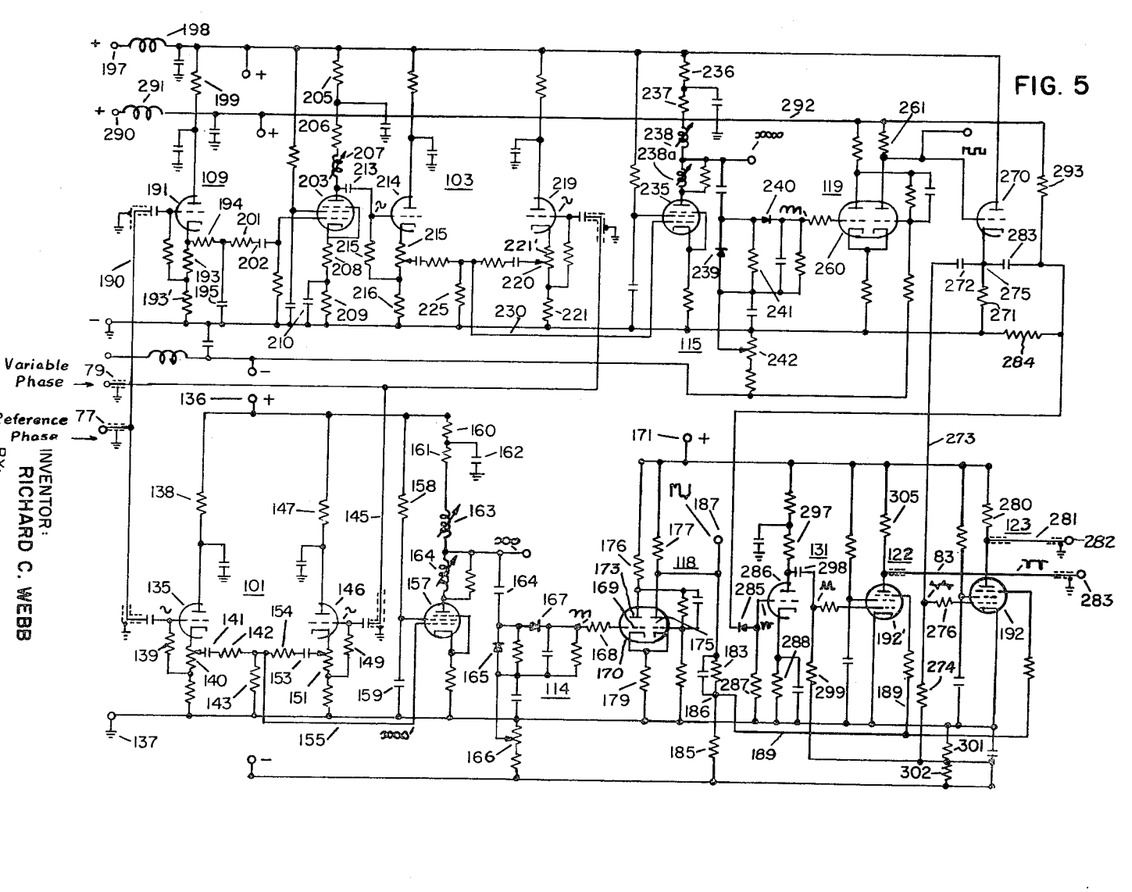
FIG. 5 is a circuit diagram of the "up-down" separator of FIG. 4.

The added voltages on the conductors 112 and 113 are then supplied to the amplitude or peak detectors 114 and 115, respectively, which are depicted more particularly by FIG. 5. Any form of detector which measures the peaks of the voltages resulting is suitable for the control and the waveforms adjacent to the output conductors 116 and 117 represent, illustratively, the rectified wave supplied at the output of detectors 114 and 115. This amplitude varying wave is then supplied to any suitable form of trigger circuit or flip-flop of which the well-known form of Schmitt trigger circuit, as conventionally shown at 118 and 119, is suitable. Again, these trigger circuits are well known but are, nonetheless, diagrammatically shown in one of their preferred circuit forms in the description and diagram of FIG. 5.

The Schmitt triggers 118 and 119 may conventionally be set to trigger on and off in accordance with the conditions depicted by the dotted lines passing through the waves of the curves positioned adjacent to conductors 116 and 117. The triggering is such that at the output of each Schmitt trigger 118 and 119 an "on-off" wave of pulsed formation appears with the wave on the conductor 121 being 90° phase-delayed relative to the wave on conductor 120. These output pulses then provide a trigger control means for developing the signal voltages of the "add" and "subtract" output pulses appearing on the conductors 83 and 85, respectively, as diagrammed by FIG. 3.

The signal outputs from the Schmitt triggers 118 and 119 are supplied to so-called "and" gates 122 and 123, respectively, with the pulses appearing on the conductor 120 (see waveform generally adjacent to conductor 120 for illustrative form) being applied to the gate 122 by way of conductor 124 and to gate 123 by way of conductor 125. These waves constitute conditioning pulses for permitting an operation of either gate 122 or 123 under a suitable control action of the output from Schmitt trigger 119. The output from the Schmitt trigger 119 is differentiated in signal differentiators 126 and 127 with the output from the differentiator 127 being applied by way of conductor 129 as the supplemental voltage effecting an opening and closing of the "and" gate 123. The differentiated voltage output from the differentiator 126 is applied by conductor 130 to a signal inverter 131 whose output is supplied by way of conductor 132 to the "and" gate 122.

The output from the trigger 119 in such connection actually serves as a supplemental control on the gates 122 and 123. The control effected thereby is such that a differentiated pulse effective to add with a continuation pulse on the "and" gate 123 is ineffective on the "and" gate 122. Likewise, since the polarity of the pulse which controls the "and" gate 122 is opposite to that of the pulse supplied to the "and" gate 123, the control is precisely opposite. Thus, for instance, if it be assumed that inputs to the gate 123 are as represented by the waveforms adajcent to conductors 120 and 129, respectively, it can be seen that the positive differentiated pulses will cause an opening of gate 123 and a control voltage of the form shown adjacent to the conductor 85 will appear at a time coinciding with each positive portion of the differentiated pulse adjacent to the conductor 129. Similarly, with the control of the gate 122 being effected by a differentiated pulse which is of opposite polarity to that shown adjacent to conductor 129 and which is of a polarity such as that shown by a wave adjacent to the conductor 120, it can be seen that the gate 122 will open on each positive portion of the differentiated wave. In this way the positive sections of the Schmitt trigger output provide conditioning for enabling pulses effective at the gates 123 and 122 and the gates are triggered in accordance with the presense or absence at the time of a positive differentiated pulse. The circuit diagram of FIG. 5 has described this part in detail.

Referring now to FIG. 5 for a further detailed description of a form of circuit to achieve the operation briefly set forth above, the circuit illustrated depicts one preferred form for providing the "up-down" separator, as controlled by the generated high frequency reference and variable sources. The reference voltages are supplied on the conductor 77 and the variable input is supplied on the conductor 79 to a first portion of the channel which includes the adder 101, the detector 114 and the trigger circuit 118 to supply the "and" gate 122. The reference signal as available on the conductor 77 is applied to the input or grid electrode of a tube 135 having its plate voltage supplied from a source of positive voltage (not shown) poled with its positive terminal connected to the terminal point 136 and its negative terminal connected, for instance, to ground 137. Plate voltage for the tube 135 is applied through the resistor 138. The grid of tube 135 is biased by the grid resistor 139 in well-known fashion. Signal output voltages are available (the tube output being connected as a cathode follower) across the cathode resistor 140 and then supplied through the condenser 141 and resistor 142 across an adding resistor 143.

The tapping point for connecting the output to the cathode resistor 140 provides for effecting a balance of the signal amplitude of the reference phase with respect to that of the variable phase and, accordingly, is adjustable as indicated by the tapping point. With the input signal of the reference phase being supplied, as above stated, the variable phase signal is then supplied to the terminal point connected to the conductor 79 and through the conductor 145 to the tube 146. Tube 146 is supplied with operating plate potential through the plate resistor 147 from the source connected at the terminal point 136. The input signal of the variable phase is applied to the input or control electrode of the tube 146 having its grid resistor 149 connected as indicated for providing bias. The tube cathode is loaded by the cathode resistor 151 connecting at its lower end to ground 137. Tube 146, like the tube 135, is also connected as a cathode follower. To balance the amplitude of the output voltage due to the variable phase input, the tapping point on the cathode resistor 151 may be adjusted up and down to provide a voltage divider.

Output signals are then fed through the capacitor 153 and the resistor 154 so that across resistor 143 the two signals, that is, the output signal from the tube 135 (the reference signal) and the output from the tube 146 (the variable signal) are combined and become available on the output conductor 155. This output is an amplitude varying envelope which contains the 5.4 mc. carrier assumed. Other circuit components connected with the tubes 135 and 146 are believed to be too well known to require further discussion it being, of course, apparent that the input signals may be fed into the input of the tubes through coaxial cables, as indicated, and that high frequencies may be by-passed from the tube outputs by the indicated capacitors.

In most instances the output representing the addition of the voltages applied to the tubes 135 and 146 is then supplied to an amplifier tube 157 via the output lead 155 connected to the inner grid or control electrode element. The tube 157 is preferably of the pentode variety. The tube screen electrode is maintained at a positive voltage from the terminal point 136 via the resistor 158 with the capacitor 159 providing an A.-C. ground. The tube plate is supplied with positive potential relative to the tube cathode through the usual plate resistors 160 and 161 with RF by-pass provided by the condenser 162. The plate potential is also supplied through a pair of serially connected inductors 163 and 164 (preferably variable) of which one may be suitably damped, as indicated. The inductors serve to introduce some signal peaking at the high frequency at which the circuit is operating, it being borne in mind that, as disclosed, the assumed operating frequency of the reference and variable phases is approximately 5.4 mc. and some signal degeneration has inherently occurred in the cathode follower connected tubes 135 and 146.

The output from the tube 157 representing the added signals as amplified is then fed into a peak detector circuit, conventionally represented at 114. These signals are supplied by way of the condenser 164 to one terminal of the diode 165, the opposite terminal of which connects to a point on the potentiometer 166 which will serve to set the level at which the Schmitt trigger 118, later to be described, can operate. The signal is also passed through a second diode element 167 and thence via the grid resistor 168 to the grid or control electrode 169 of the first half of a tube 170 which tube half constitutes a part of the so-called Schmitt trigger.

The Schmitt trigger operates in well-known fashion and consists of a double tube having its plate or anode electrodes supplied with a positive potential from a suitable source (not shown), connected to the terminal point 171 and thence to the separate plates or anodes 173 and 175 by way of the plate resistors 176 and 177. As is well known, the cathode elements of the Schmitt trigger are connected together, as shown, and connect through a cathode resistor 179 to ground at point 137. The trigger operates in such a fashion that the triggering level is set by the tapping point on the potentiometer 166, which tapping point, in the magnitude of the voltage available, has been indicated by the dotted line on the curve adjacent to the conductor 116 of FIG. 4. The general waveform is also indicated by the wave adjacent to the input resistor 168 so that when a positive pulse is arriving on the grid 169 of the tube 170 current is caused to flow through the first half of the tube which immediately blocks the second half in a fashion well known. This effect produces a pulse at the output which is available across the voltage divider combination including the resistors 183 and 185 at the tapping point 186. The right hand half of the tube 170 is held inoperative during the entire period of operation of the left half of the tube as occasioned by the input signal voltage exceeding the threshold bias applied. As soon as the signal input to the grid 169 is less than that of the triggering level, the left half of the tube 170 cuts off and, with cut-off there occurring, the potential effective at the grid or control electrode of the right hand half of the tube immediately rises in a positive sense and maximum current at once flows through the right hand tube half. This occurring, the left half of the tube is cut off and the voltage output is substantially of that waveform shown adjacent to the output terminal point 187. A similar waveform, but of lesser amplitude, appears at the junction point 186 of resistors 183 and 185. The voltage developed at point 186 is applied by way of conductor 189 to each of the "and" gate tubes 192 and 192′, forming the gates 122 and 123, to provide an enabling or continuing pulse thereon.

The reference phase voltage of conductor 77 is also applied by way of conductor 190, which may be a coaxial cable, if desired, to the grid or control electrode of tube 191 whose output is derived across the cathode resistors 193 and 193′ by way of the integrating circuit formed from the resistor 194 and the condenser 195. Plate voltage for the tube 191 is applied from a terminal point 197 through an inductor 198 (if desired) and the resistor 199. Since the amplitude of the integrated signal voltage at the output of the integrating circuit 194, 195 may have dropped to a limited extent, this signal voltage is supplied through the resistor 201 and the coupling condenser 202 to the grid or control electrode of the tube 203. Tube 203, like tube 157, already described, is preferably a pentode and illustratively may be of the 6AH6 type. Operating or plate voltage is supplied from the terminal point 197 through the plate resistors 205 and 206 and the peaking inductor 207. Cathode bias is applied through cathode resistors 208 and 209 of which at least one is appropriately by-passed by the condenser 210.

Signal outputs from the tube 191 representing the signal of the reference phase, shifted in polarity by tube 203, are then supplied to the adding circuit, conventionally represented at 103, by coupling the output from the tube 203 through the coupling condenser 213 to the grid or input electrode of tube 214, provided with the usual grid-leak resistor 215.

Tube 214 is supplied in the indicated fashion with operating voltages from the terminal 197. Its output is derived across the cathode resistors 215' and 216, serially connected, where the output is obtained at a suitable tapping point to bring the signal level commensurate with that of the variable phase signal provided on the conductor 79 which is supplied to the second tube 219 of the adder combination, as will be explained. When signal voltages are applied at the terminal 79 and through the indicated conductor to the tube 219, the output signal voltage is available at the conductor 220 and coupling capacitor where the polarity corresponds to that of the voltage supplied to the tube grid. The tube cathode is provided with the usual cathode resistors 221 and 221' and the output signal voltage (derived in cathode-follower fashion, as above stated) is supplied as an output voltage of controlled amplitude determined by the setting position of the tapping point 220 on the cathode resistor 221'. So arranged, the cathode outputs of tubes 214 and 219 are then added across resistor 225 and applied through conductor 230 to an output circuit through a suitable peaking circuit in the output of the tube 235. The input voltage is applied to the control grid of the tube 235 to which the input conductor 230 is connected. The tube 235 is supplied with operating plate voltage from the the terminal point 197 through the inductor 198, the plate resistors 236 and 237, as well as the peaking inductors 238 and 238a. Voltage is applied to the screen electrode in the indicated fashion from terminal 197. Accordingly, tube 235 compensates for any signal amplitude loss resulting from the cathode follower connections of the preceding tubes of the circuit and the high frequencies are maintained.

Output voltage from tube 235 is then supplied to the peak detector combination comprising diodes 239 and 240, by-passed by a suitable resistor 241 and having the potentiometer 242 provided with an adjustable tapping point to set the triggering level. With signal output being derived across the peak detector circuit, the resulting signal voltage is applied to the control grid of a Schmitt trigger tube 260 and controls the trigger in a fashion which essentially duplicates that already described in connection with the tube 170 and need not be here repeated. Suffice it to say that the Schmitt trigger tube 260 provides at its output square wave voltage pulses of the character indicated by FIG. 4, which pulses are then supplied across the output resistor 261 and are effective upon the grid of the tube 270. The tube 270 also derives its operating potential from the terminal point 197 and has its output made available across its cathode resistor 271.

In the illustrated instance, the tube 270 provides an output signal voltage through the condensor 272 and conductor 273 across resistor 274 to the control grid of the gate tube 192. The output of the tube 270 at point 275 is actually in the form of a pulse and the combination of the small condenser 272 and the resistor 274 form a differentiating circuit to apply the controlling pulses through resistor 276 to the control electrode of tube 192. It has already been stated that the enabling or conditioning pulses are applied to this tube 192 by way of conductor 189 which are supplied to the suppressor grid for enabling or conditioning the gate so that, during time periods when the gate is conditioned by a positive pulse, the tube is carried to a conducting state during the positive pulse portions of the differentiated wave appearing at the junction of the condenser 272 and the resistor 274. At these times an output signal voltage is derived across the load resistor 280 and becomes available through conductor 281 and at the terminal point 282 so that there is there provided an output signal pulse of a subtract variety indicating that the phase angle between the reference frequency and the variable frequency is decreasing.

Also available from the output of the cathode follower connected tube 270 there is a second output signal which is supplied through the coupling condenser 283 and across resistor 284 forming a differentiating combination, and then through the diode 285 to the grid or control electrode of the tube 286, the signal being applied across the grid resistor 287 which has its lower end terminal at ground potential. The cathode bias of the tube 286 is provided by way of the by-passed cathode resistor 288 to set and determine the level of the signals supplied on the input or control electrode of the tube 286. Positive potential available at an input terminal 290 through an inductor 291 and conductor 292 establishes a positive bias through the resistor 293 which biases the diode 285 above ground potential to a selected value. Consequently, although the signal amplitude available at the input or control electrode of the tube 270 may be as much as 30 volts, for instance, the applied bias may be set at such value that the signal magnitude available at the input grid or control electrode of the tube 286 is reduced to the order of a few volts.

As made apparent from the diagrammatic showing of FIG. 4, whatever control pulses are provided upon the "and" gate 122 are inverted in phase with respect to those pulses applied to the "and" gate 123. Hence, the inversion is provided in the tube 286 which amplifies the signal level and provides the amplified signal across the plate resistor 297 and the coupling condenser 298 to the control electrode or grid of the tube 192'. The bias on the tube 192' is set by way of the grid resistor 299, tapped to a point of selected value on the voltage divider comprising resistors 301 and 302. Consequently, at times when the gate tube 192' is supplied with an enabling or conditioning pulse in the positive direction by way of conductor 189, it can be seen that an input pulse supplied at the time a positive voltage is effective on the suppressor grid produces output pulses available across the plate resistor 305 and conductor 83 to terminal 283.

Many and varied modifications may be made to the circuitry here claimed and described. Therefore, it is believed that the claims hereinafter appended should be considered broadly and limited only insofar as prior art limitations necessitate it.

What is claimed is:

1. An add and subtract signal separator, for use with a pair of transducer elements to provide output signals, said separator comprising a pair of gating devices of which the output of one of said devices is adapted to indicate a condition of add and of which the output of the other said gating devices is adapted to indicate a condition of subtract, a first on-off trigger for supplying first control signal voltages to said gating devices to enable said gating devices, a second on-off trigger circuit for producing second control signal voltages, means for supplying said second control signal voltages to said gating devices in an out of phase relationship to provide trigger pulses to the gating devices while said conditioning pulses are supplied thereto, a first add circuit for generating first beat frequency signals responsive to input signals supplied thereto, means for supplying a pair of input signals to the said first add circuit, said input signals having substantially the same frequency but subject to a phase shifted relationship to each other, first peak detector means operated responsive to the first beat frequency signals for providing first detected signals that are a function of the amplitude of the said added signals, means for operating the first on-off trigger circuit responsive to the first detected signals, a second add circuit for generating second beat frequency signals responsive to input signals supplied thereto, means for phase shifting one of said pair of input signals, means for supplying said phase shifted input signal and the other of said pair of input signals to said second add circuit to generate second beat frequency signals that are phase shifted from said first beat frequency signals, a second peak detector operated responsive to said second beat frequency signals for providing second detected signals that are a function of the amplitude of said second beat frequency signals, and means for controlling the second on-off trigger circuit responsive to said second detected signals, whereby said one of said pair of gating devices conducts when said phase shifted relationship of said pair of input signals is positive and said other of said pair of gating devices conducts when said phase shifted relationship of said pair of input signals is negative.

2. An add and subtract signal separator for supplying either an add signal output or a subtract signal output dependent on whether a variable frequency input signal is higher or lower in frequency than a reference frequency input signal respectively, said separator comprising a pair of gating devices of which the output of one is adapted to indicate a condition of add and of which the output of the other is adapted to indicate a condition of subtract, a first on-off trigger circuit for producing enabling voltages, means for supplying the said produced enabling voltages to said pair of gating devices, a second on-off trigger circuit for producing control signal voltages, means for supplying said control signal voltages to the other of said pair of gating devices while said enabling voltages are supplied thereto, means for inverting the phase of said control signal voltages, means for supplying said phase inverted control signal voltages as operating pulses to the one of said pair of gating devices while said enabling voltages are supplied thereto, a reference frequency oscillator and a variable frequency oscillator, a first add circuit means connected to combine the outputs of said reference frequency oscillator and said variable frequency oscillator to produce a first beat frequency signal that is a function of the frequency difference of the outputs of said oscillators, a first peak detector means for producing detected signals determined by the amplitude of said first beat frequency signal, integrator means for phase shifting the output of said variable frequency oscillator, a second add circuit means connected to combine the output of said variable frequency oscillator and said integrator means to produce a second beat frequency signal that is of the same frequency as said first beat frequency signal but phase shifted relative thereto, a second peak detector means for producing phase shifted detected signals determined by the amplitude of said second beat frequency signal and means to actuate the first on-off trigger under the control of the said detected signals and means for actuating the second on-off trigger under the control of said phase shifted detected signals.

3. An add and subtract separator comprising a first and a second gating means of which the output of said first gating means indicates an add condition and of which the output of said second gating means indicates a subtract condition, a first on-off trigger for supplying enabling pulses to said first and second gating means, a second on-off trigger for producing operating pulses, differentiator means operated responsive to said operating pulses for producing operating spikes, inverter means for phase inverting said operating spikes, means for supplying said phase inverted operating spikes to said first gating means for producing said "add" condition when said phase inverted operating spike and said enabling pulses coincide, and means for supplying said operating spikes to said second gating means for producing said "subtract" condition when said operating spike and said enabling pulses coincide.

4. A control circuit operated responsive to the receipt of a reference frequency signal and a variable frequency signal having a slightly different frequency than said reference frequency, a first adder circuit for mixing said reference frequency signal and said variable frequency signal to produce a first beat frequency, integrator means operated responsive to said reference frequency signal for providing a phase lagging reference frequency signal, a second adder circuit for mixing said variable frequency signal and said phase lagging reference frequency signal to produce a second beat frequency signal that is out of phase with said first beat frequency signal, first detector means operated responsive to said first beat frequency signal for providing a first detected signal, second detecting means operated responsive to said second beat frequency signal for providing a second detected signal that is out of phase with said first detected signal, first trigger means operated responsive to said first detected signal for providing first control pulses, second trigger means operated responsive to said second detected signal for providing second control pulses, a first output gate for providing an output signal when said variable frequency signal is of a higher frequency than said reference frequency signal, a second output gate for providing an output signal when said variable frequency signal is of a lower frequency than said reference frequency signal, means for supplying said first control pulses directly to said first and said second output gates to enable said gates, differentiating means operated responsive to said second control pulses to provide operating signals, means for inverting a portion of said operating signals, means for supplying said operating signals to said second gate to operate said second gate when said operating signal and said enabling pulses coincide and means for supplying said inverted operating signal to said first output gate to operate said first output gate when said inverted operating signal and said enabling pulses coincide.

References Cited by the Examiner
UNITED STATES PATENTS

| | | | |
|---|---|---|---|
| 2,947,929 | 8/60 | Bower | 340—347 |
| 3,045,230 | 7/62 | Tripp et al. | 340—347 |

MALCOLM A. MORRISON, *Primary Examiner.*